United States Patent Office 2,976,813
Patented Mar. 28, 1961

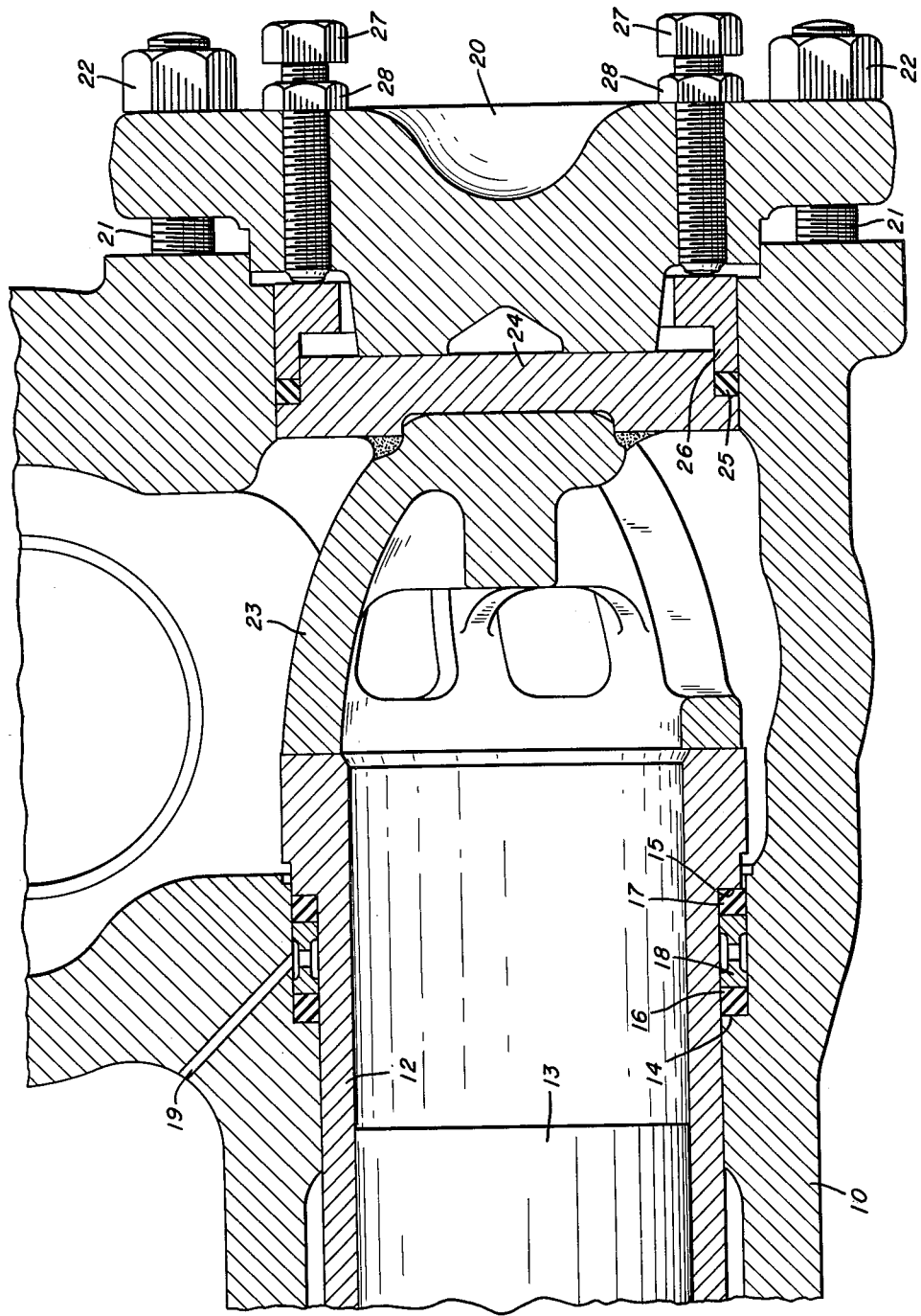

2,976,813

LINER ASSEMBLY

William J. Redman, Pittsburgh, Pa., assignor to United States Steel Corporation, a corporation of New Jersey Filed Mar. 13, 1958, Ser. No. 721,163

1 Claim. (Cl. 103—216)

This invention relates to an improved assembly for retaining a liner in a cylinder of a reciprocating mechanism.

Although the invention is not limited to any specific reciprocating mechanism, it is particularly applicable to a duplex power slush pump used for circulating drilling mud in drilling an oil well. Conventionally cylinder bores of a slush pump contain removable liners of wear resistant material. Slush pumps operate at high pressures which act alternately on opposite ends of these liners, whereby the liners tend to work back and forth. It is necessary to provide a fluid-tight seal between each cylinder bore and its liner, which seal is difficult to maintain because of the way pressure is applied. Commonly the liner is held in the bore by a retainer assembly which includes a spacer abutting the liner face of the cylinder head at one end and the outer face of the liner at the other. The liner can have either metal-to-metal bearing contact with the cylinder, or else it can bear against the cylinder only through the packing which furnishes the seal. The latter arrangement not only permits the packing to be compressed more tightly, but also to be compressed further after the pump has been used, and hence usually is preferred.

An object of the present invention is to provide an improved retainer assembly which facilitates compressing the packing between a liner and a cylinder bore and which allows packing at the end of a cylinder to be compressed independently of the first mentioned packing.

A further object is to provide an improved retainer assembly which enables a cylinder head to be fixed to a cylinder with the full complement of fasteners regardless of the size of liner, thus overcoming the need to use fewer fasteners with liners of smaller sizes.

In accomplishing these and other objects of the invention, I have provided improved details of structure, a preferred form of which is shown in the accompanying drawing, in which:

The single figure is a fragmentary longitudinal sectional view of a cylinder and liner equipped with a retainer assembly constructed in accordance with my invention.

The figure shows a conventional cylinder 10 of a reciprocating mechanism, such as a slush pump. A tubular liner 12 of wear resistant material is received in the cylinder bore and contains a conventional reciprocating element 13. The cylinder bore and the liner have spaced apart confronting internal and external shoulders 14 and 15 respectively which confine packing for effecting a seal between the bore and liner. The packing illustrated is of a known type which includes two resilient rings 16 and 17 abutting the respective shoulders 14 and 15 and a lantern ring 18 interposed between the resilient rings. The cylinder wall contains a tell-tale passage 19. If the packing commences to leak, some of the leaking fluid escapes through the tell-tale passage to warn the operator. A cylinder head 20 is fastened to the end of the cylinder with studs 21 which extend from the end face of the cylinder wall and nuts 22 engaged with said studs. The mechanism can include valves of any conventional arrangement, not shown since they are not involved in my invention.

In accordance with my invention, the retainer assembly for the liner 12 includes a spacer 23 and a disk 24 fixed to the outer end of the spacer. The inner end of the spacer abuts the outer end of the liner 12 in the usual manner, while the disk is closely received within the end of the cylinder bore. The outer face of the disk abuts the inner face of the cylinder head 20, whereby tightening of nuts 22 transmits a compressive force to the packing 16, 17, 18 via the cylinder head, disk, spacer and liner. The outer circumferential edge of the disk is recessed and receives a resilient packing ring 25 and a gland 26. A plurality of tightening screws 27 are threadedly engaged with the cylinder head and bear against the outer end face of the gland. Preferably these screws carry lock nuts 28. The resilient ring 25 effects a seal at the end of the cylinder and is compressed by turning the tightening screws 27, which act through the gland 26.

The action which takes place in compressing the packing 16, 17 and 18 between the cylinder bore and liner is independent of that which takes place in compressing the packing 25 at the end of the cylinder. The former is controlled by the nuts 22 and the latter by the tightening screws 27. Thus it is possible to compress either packing as needed without acting on the other. Furthermore the cylinder head 20 always can be full sized and held with its usual complement of fasteners. There is no need to use smaller sizes of cylinder heads with smaller liners.

While I have shown and described only a single embodiment of my invention, it is apparent that modifications may arise. Therefore, I do not wish to be limited to the disclosure set forth but only by the scope of the appended claim.

I claim:

In a reciprocating mechanism which includes a cylinder, a liner within said cylinder, said cylinder and liner having spaced apart confronting shoulders, packing in the space between said shoulders furnishing a seal between the cylinder bore and liner, a cylinder head closing the end of said cylinder; and additional packing furnishing a seal at the end of said cylinder, the combination therewith of a retainer assembly for said liner comprising a spacer abutting the end of said liner, a disk fixed to the end of said spacer and being closely received in the cylinder bore and abutting the inner face of said cylinder head, a plurality of screw-threaded studs fixed to the end of said cylinder, said cylinder head having an outwardly projecting circumferential flange through which said studs extends, nuts threadedly engaged with the respective studs and adapted to be tightened against said flange for transmitting force directly through said disk, spacer and liner to compress said first named packing independently of said additional packing, said disk having a recess around its outer edge receiving said additional packing, a gland in the end portion of said cylinder bearing against said additional packing and having an inwardly projecting circumferential flange, and a plurality of tightening screws threadedly engaged with said cylinder head and bearing against said last named flange for compressing said additional packing, said tightening screws being situated inwardly of said studs to permit the inclusion of a full complement of studs.

References Cited in the file of this patent

UNITED STATES PATENTS

| | | |
|---|---|---|
| 2,198,301 | Campbell | Apr. 23, 1940 |
| 2,717,186 | Campbell | Sept. 6, 1955 |
| 2,732,809 | Mattingly et al. | Jan. 31, 1956 |
| 2,784,040 | Head | Mar. 5, 1957 |
| 2,869,945 | Mattingly | Jan. 20, 1959 |

UNITED STATES PATENT OFFICE
CERTIFICATE OF CORRECTION

Patent No. 2,976,813            March 28, 1961

William J. Redman

It is hereby certified that error appears in the above numbered patent requiring correction and that the said Letters Patent should read as corrected below.

Column 1, line 27, for "liner" read -- inner --.

Signed and sealed this 12th day of September 1961.

(SEAL)
Attest:

ERNEST W. SWIDER            DAVID L. LADD
Attesting Officer            Commissioner of Patents

USCOMM-DC